United States Patent [19]

Bussiere

[11] Patent Number: 4,683,957
[45] Date of Patent: Aug. 4, 1987

[54] AGRICULTURAL IMPLEMENT INCLUDING A CENTRAL SECTION AND TWO WING SECTIONS

[76] Inventor: Laurent L. Bussiere, P.O. Box 118, Vonda, Saskatchewan, Canada, S0K 4N0

[21] Appl. No.: 837,734

[22] Filed: Mar. 10, 1986

[51] Int. Cl.[4] ................................................ A01B 73/04
[52] U.S. Cl. ..................................... 172/311; 172/776
[58] Field of Search ............... 172/311, 446, 456, 776, 172/310; 280/411 R, 411 A, 412, 413

[56] References Cited

U.S. PATENT DOCUMENTS

| 3,960,221 | 6/1976 | Blair et al. | 172/311 |
| 4,360,215 | 11/1982 | Nohl et al. | 172/311 X |
| 4,479,554 | 10/1984 | Kueker | 172/311 |
| 4,502,546 | 3/1985 | Moos | 172/311 |
| 4,529,040 | 7/1985 | Grollimund | 172/311 |
| 4,570,722 | 2/1986 | Osborn | 172/456 X |
| 4,583,598 | 4/1986 | Knels | 172/456 X |

FOREIGN PATENT DOCUMENTS

| 687645 | 6/1964 | Canada . |
| 1027416 | 3/1978 | Canada . |
| 1032812 | 6/1978 | Canada . |
| 1056194 | 6/1979 | Canada . |
| 1089281 | 11/1980 | Canada . |
| 1111700 | 11/1981 | Canada . |

| 1592859 | 7/1981 | United Kingdom | 172/456 |

Primary Examiner—Richard T. Stouffer
Attorney, Agent, or Firm—Adrian D. Battison

[57] ABSTRACT

A pull-type agricultural implement of the type comprising a central section and wing sections on either side, each of which includes inner and outer wing sections, can be folded into a transport position in which the inner wing section lies vertically and the outer wing section turns inwardly parallel to the central section. The coupling between the central section and the inner wing section is provided by a pair of levers which are pivotally mounted to the central section inboard of the ends thereof so as to extend in a straight line above a strut and then cranked downwardly to be coupled to the inner wing section by a pivot coupling providing two directions of rotation. Relative movement can therefore be obtained by pivoting of the levers about their pivot coupling on the central frame. A hitch for the implement includes a central hitch portion and wing hitch portions which are pivotally coupled to the central portion and are connected to the wing sections by chains. The folding position can be obtained by retracting a piston and cylinder to draw in the outer wing section followed by the inner wing section. The cylinder is coupled to the outer wing section through a sliding link.

13 Claims, 5 Drawing Figures

AGRICULTURAL IMPLEMENT INCLUDING A CENTRAL SECTION AND TWO WING SECTIONS

BACKGROUND OF THE INVENTION

This invention relates to an agricultural implement including a central section and two wing sections arranged on respective sides of the central section for conjoint movement forwardly across the ground under motive power from a towing vehicle.

As agricultural implements of this type, for example cultivators, have become wider, they have incorporated a number of separate sections which must be connected together for conjoint movement but also must be articulated relative to one another to allow relative pivotal movement over uneven terrain.

In addition implements of this type must generally be folded in order to reduce them in width for transport from one location to another. It is known therefore to have an implement of this type which includes a central section having on either side a wing section where each wing section comprises an inner portion and an outer portion so that when folded the inner portion stands vertically above the outer sides of the central portion and the outer portion extends inwardly parallel to the central portion but spaced above.

The pivotal connection therefore between the central section and the inner wing section must be adapted to accommodate the articulation and also to accommodate this lifting movement.

In addition, a hitch arrangement must be provided which applies motive force to the central section and to the wing sections and yet again allows folding movement to obtain the transport position.

Various arrangements have been proposed for the pivotal couplings and for the hitch, however these are still open to simplification and improvement.

It is one object of the present invention, therefore, to provide an improved coupling arrangement of the above type.

According to the invention, therefore, there is provided a pull-type agricultural implement comprising a central frame section and two outer wing sections, the sections arranged in-line transverse to the direction of working motion of the implement, each section comprising a frame for supporting ground-working tools and ground wheels for carrying the frame across the ground, and pivotal coupling means for coupling an abutting end of each wing frame to a respective abutting end of the central frame, said pivotal coupling means including a lever, means mounting one end of the lever on the wing frame adjacent the abutting end thereof for pivotal movement about a horizontal axis, means mounting the other end of the lever on the central frame at a position inboard of the abutting end thereof for pivotal movement about a horizontal axis whereby the lever is free to lift in a vertical direction to allow the abutting end of the wing frame to lift and means on the central frame restricting the downward movement of the lever to limit the downward movement of the abutting end of the wing frame.

It is one advantage of the present invention therefore, that the coupling is provided by a lever which can lift and fall to provide the relative pivotal movement between the wing section and the central section and yet when it is desired to lift the wing section the lever is restricted in its downward movement by contact with the frame so that the wing section can be lifted about the pivot of the lever.

A second lever parallel to the first and similarly mounted can be included to provide spaced pivot points to more accurately control the movement of the wing section.

The hitch arrangement can include a central hitch portion for co-operating with the central frame section and two outer or wing hitch portions which are pivotally coupled to the central hitch portion so as to be foldable similarly to the wing sections themselves. Each wing hitch portion is attached to the respective wing section by a flexible chain which provides the necessary motive power and yet can accommodate any movement between the whole of hitch or the hitch portions and the wing sections. This arrangement allows the wing hitch portions to be effectively self-supporting, that is they are supported solely by the central hitch portion and by the chain without any necessity for ground wheels which add complication and expense.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
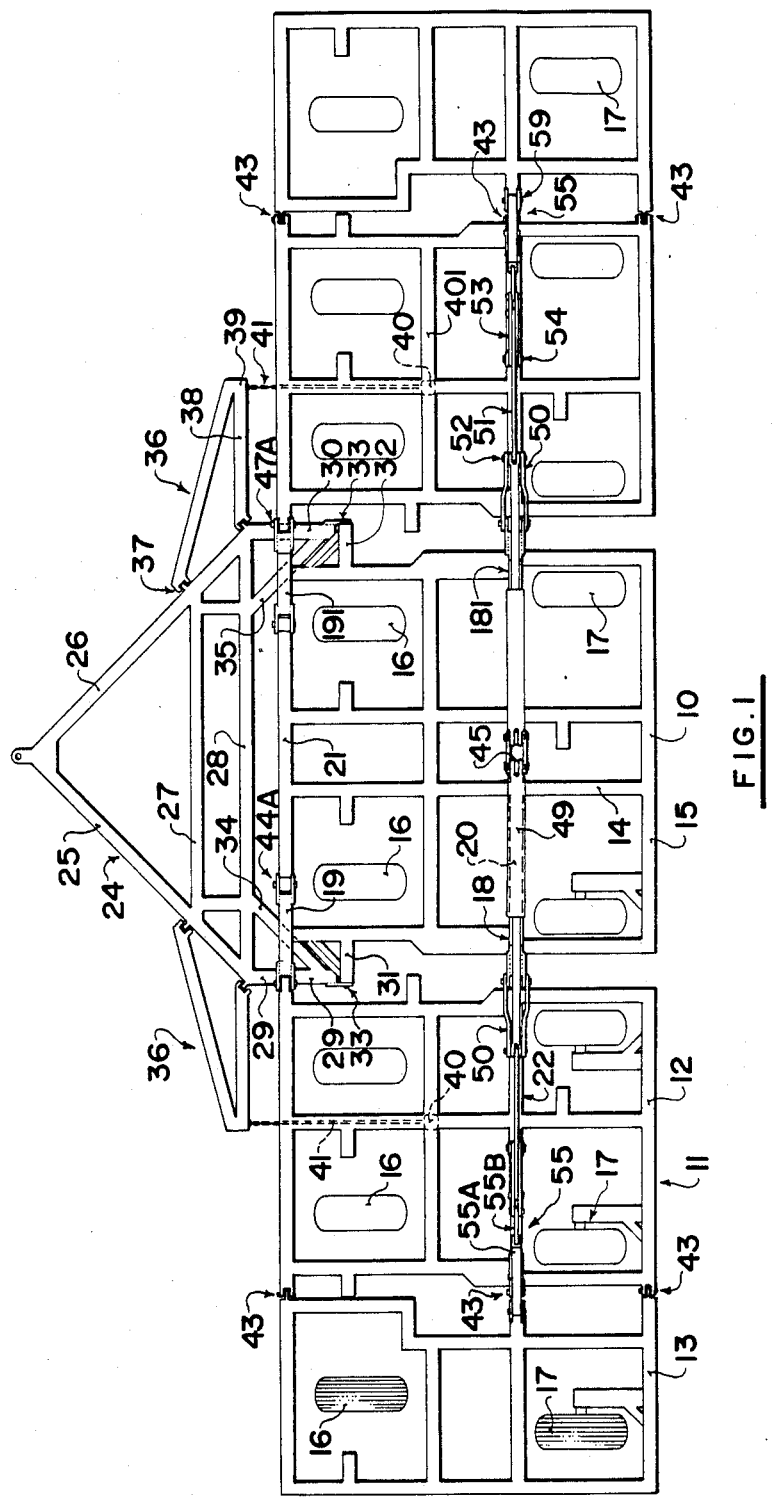
FIG. 1 is a simplified plan view of an agricultural implement according to the invention.

An agricultural implement of the pull-type which can be used for supporting various types of ground working tools is shown in FIG. 1 and includes a central section 10 and a pair of wing sections 11, each including an inner section 12 and an outer section 13. Each section comprises a frame including longitudinal and transverse frame members indicated, for example, at 14 and 15. Each of the frames is supported on ground wheels 16, 17 arranged at the front and rear respectively of the frame. Thus the central frame 10 is supported on four such ground wheels arranged generally at the corners with the rear ground wheels 17 fixed in orientation relative to the frame and the front ground wheels 16 arranged as caster wheels to accommodate steering movements of the frame.

Similarly, the frame of the inner wing section 12 is mounted on four such ground wheels 16, 17 while the other wing section 13 is supported only on two such ground wheels and is approximately half the width of the central frame 10.

The interconnection between the central frame 10 and the inner frame 12 is provided by a pair of levers 18, 19 which are shown in more detail in FIGS. 2 and 4 respectively and will be described in more detail hereinafter. It will be noted however that the lever 18 lies directly above a transverse frame member 20 which extends fully across the frame 10. The lever 18 thus extends approximately at midpoint of the strut or frame member 20 outwardly to one side thereof and similarly the lever 181 for the opposite wing section extends from approximately the midpoint.

The strut 20 extends transversely of the frame 10 approximately in a midpoint thereof relative to the front and rear direction. The lever 19 is, however, positioned directly at the front of the frame again on a strut indicated at 21 which again extends fully across the frame and supports the lever 191 for the opposite wing section.

Figure 2:
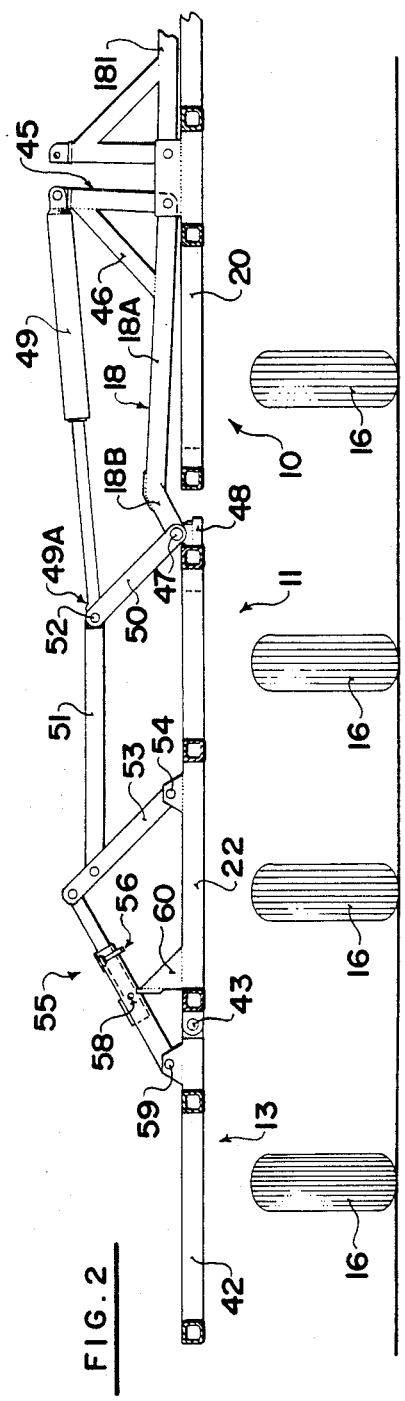
FIG. 2 is a partial rear elevational view of the implement of FIG. 1.
Figure 3:
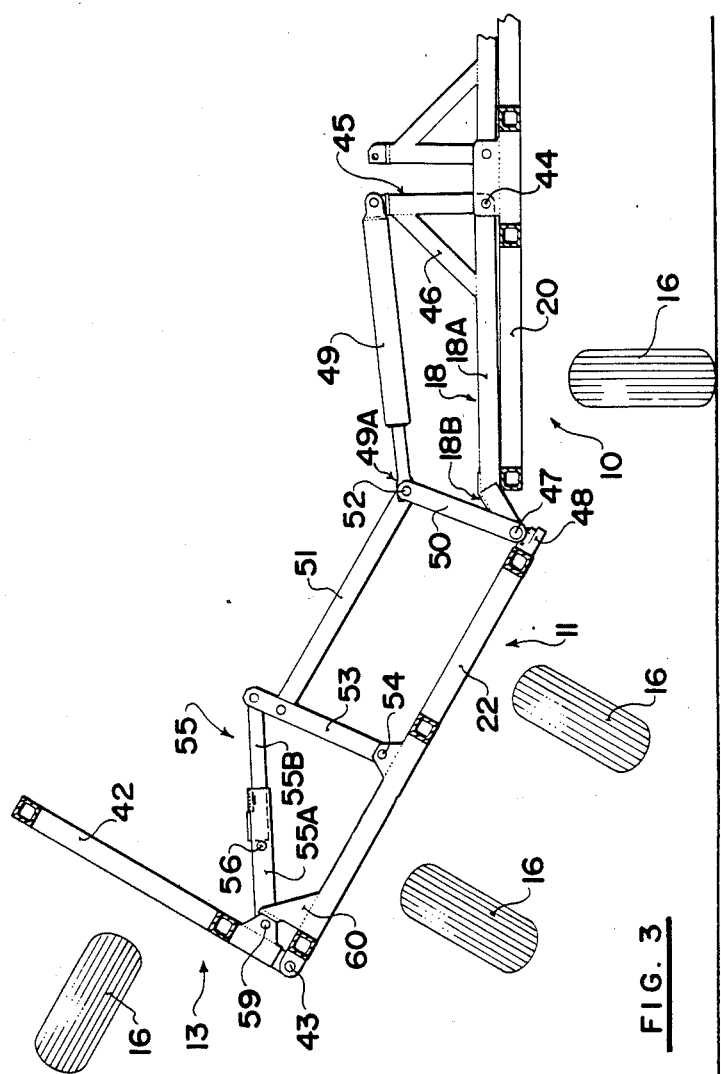
FIG. 3 is a view of the same parts as FIG. 2 in a partly elevated position of the wing section.

For convenience of illustration the lifting mechanism illustrated in detail in FIGS. 2 and 3 has been omitted from FIG. 1 but of course it will be apparent that the lifting mechanism lies directly above the lever 18 and directly above a strut 22 of the wing frame section 12.

A hitch assembly for the implement is generally indicated at 23 and includes a substantially triangular central hitch section 24 including outwardly extending arms 25 and 26 and transverse beams 27, 28. The triangular frame 24 is connected to the central frame 10 by rearwardly extending struts 29, 30 which are pivotally coupled to outwardly extending brackets 31, 32 which lie at right angles to the sides of the central frame section. The pivotal coupling is by way of a pivot pin and flanges generally indicated at 33 but of course of well known construction. The whole of the central portion of the hitch can therefore pivot about a horizontal axis defined by the couplings 33 to accommodate uneven terrain.

Outer or wing sections of the hitch are generally indicated at 36 for co-operating with the wing sections of the implement. Each of the hitch wing portions is pivotally mounted to the respective arm 25, 26 at a pair of spaced pivot points indicated at 37 so as to define a substantially triangular section which extends outwardly from the side of the central section with one side of the triangle indicated at 38 parallel to the transverse strut 28 of the central section. The hitch wing section can therefore pivot upwardly and downwardly relative to the pivot couplings 37 so that it can be folded to a position vertically relative to the arm 26, 25. The apex of the hitch wing portion indicated at 39 is coupled to bracket 40 on a strut 401 of the inner wing section of the implement by a chain 41 which provides a totally flexible coupling. The chain can therefore accommodate relative movement between the hitch central section, the hitch wing section and the implement wing section both in the working mode due to uneven terrain and in the folding position described in more detail hereinafter.

The torsion of the chain 41 caused by the forward motion of the hitch drawing the implement wing section retains the apex 39 at a position spaced from the ground so this is supported solely by the chain 41 and by the pivot couplings 37 on the central hitch section.

Turning now to FIG. 2, a portion of the implement of FIG. 1 is shown including half of the strut 20, the strut 22 of the frame 12 and also the strut which lies in line with those struts of the section 13 which is indicated at 42. In addition, the ground wheels 16 are shown schematically with the mounting arrangement omitted for simplicity of illustration. Furthermore, the ground-working tools are omitted again for simplicity of illustration but these will be apparent to one skilled in the art.

The coupling between the outer wing section and the inner wing section is provided by a conventional flange and pin coupling indicated at 43 in FIG. 2 and it will be noted from FIG. 1 that such coupling is provided at each of the transverse struts so that movement between the outer and inner wing sections is limited to pivotal movement about a horizontal axis parallel to the direction of movement.

The lever 18 previously mentioned and mounted directly above the strut 20 is pivotally coupled to the strut 20 adjacent a midpoint of the strut 20 by a flange and pin coupling indicated at 44. The lever 18 then includes a substantially straight portion 18A which extends to a position at the end of the strut 20 and then includes a downwardly cranked portion 18B which extends beyond the end of the strut 20.

At the inner end of the lever 18 is mounted a vertical support bar 45 which is directly coupled to the lever 18 for pivotal movement therewith and is supported in its orientation by an angled strut 46 coupled to the lever 18.

The outer end of the lever 18 carries a pivot pin 47 which lies in a horizontal plane parallel to the ends of the central frame 10 and the wing frame 11. The pin 47 is in turn carried on a further pin 48 which is rotatable about a horizontal axis at right angles to the ends of the frames. The pins 47 and 48 therefore provide rotational or pivotal movement about two axes at right angles. The pin 48 is firmly coupled to the strut 22. It will be appreciated therefore that any upward and downward movement of the pin 48 caused by movement of the frame to accommodate uneven terrain will cause upward and downward pivoting movement of the lever 18 about the pivot coupling 44. In addition, rotational movement of the frame 11 about the strut 22 will be accommodated by pivotal movement thereof about the pin 48 so that there is no twisting of the lever 18.

Figure 4:
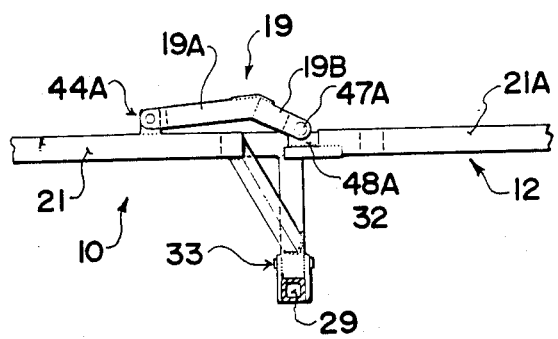
FIG. 4 is a partial front elevational view of the implement of FIG. 1.

Turning now to FIG. 4, a second lever 19, similar to the lever 18 but reduced in length or shorter in length, is coupled to the frame 11 or more specifically the strut 21 by a similar pivot coupling 44A and is also coupled to a strut 21A of the frame 12 by a pair of pins 47A and 48A similar to those of the lever 18.

As previously explained in relation to the lever 18, therefore, the lever 19 also includes a straight section 19A and a downwardly cranked section 19B which allows the end of the frame 12 to move upwardly and downwardly and also to rotate about the strut 21A. In such rotational movement about the strut 21A, it will be appreciated that the strut 22 is merely lifting which is accommodated by upward pivoting of the lever 18.

The downwardly cranked portions 18B and 19B are of sufficient length so that the frame 12 can fall to a position beneath the frame 10 on occasions when the terrain requires such movement. The movement is, however, limited by engagement of the under surface of the straight portion of the lever 18, 19 with the upper surface of the adjacent strut 20, 21. Thus the downward movement is limited but in practise is sufficient to accommodate normally acceptable differences in terrain.

The levers at 18 and 19 therefore provide the sole pivot connection between the central section and the wing section. However, in order to lift the wing section into the folded transport position previously explained, a cylinder and piston arrangement generally indicated at 49 is coupled to the vertical support 45. The end of the piston rod indicated at 49A is connected to a lever 50 which is pivotally mounted on the strut 22. For convenience the lower end of the lever 50 is connected to the pivot pin 47. A connecting link 51 is coupled to the upper end of the lever 50 for pivotal movement about a pin 52 so as to communicate movement of the piston rod to a further lever indicated at 53 which in turn is coupled at 54 to the strut 22 and at its upper end to a sliding link 55.

The sliding link 55 includes an outer sleeve 55A and an inner sliding member 55B which are free to move inwardly and outwardly relative to each other. The sleeve 55A is pivotally coupled to the end of the outer wing frame 13 adjacent the coupling 43.

The sliding link 55A, 55B therefore accommodates pivotal movement about the coupling 43 of the outer wing section relative to the inner wing section depending again on uneven terrain. However, when it is required to lift the wing sections into the folded position, a latch pin 56 is withdrawn from a storage position and is introduced into an opening 58 so as to restrict further movement between the sleeve 55A and the sliding member 55B. At this point the cylinder 49 is actuated to withdraw the piston rod. This movement is communicated through the link 51 and the sliding link 55 to the outer wing frame section through the pivot coupling 59. This position is indicated in FIG. 3 where the outer wing frame section is drawn up into a vertical orientation relative to the inner wing section until the flanges defining the pivot coupling 59 contact a stop member 60 thus limiting movement beyond the vertical orientation.

When this movement has completed, further withdrawing movement of the cylinder 49 acts to draw inwardly the outer end of the inner wing section. As soon as the weight of the inner wing section is taken from the ground wheels, the lever 18 is drawn by the weight downwardly into contact with the strut 20 so that the lever 18 and particularly the cranked portion 18B thereof supports the inner end of the inner wing section. Similarly from FIG. 4 it will be appreciated that the lever 19 similarly supports the front end of the inner wing section. The pivotal movement of the inner wing section about the pivot pin 47 then continues until the inner wing section is held vertically directly above that pin. Thus the folded transport position is completed with the outer wing section lying generally parallel to the central section but directly there above.

It will be appreciated, therefore, that the levers 18 and 19 provide a coupling between the central section and the wing sections which allows the necessary articulation or relative movement and yet acts to fully support the wing sections when raised to the transport position.

Figure 5:
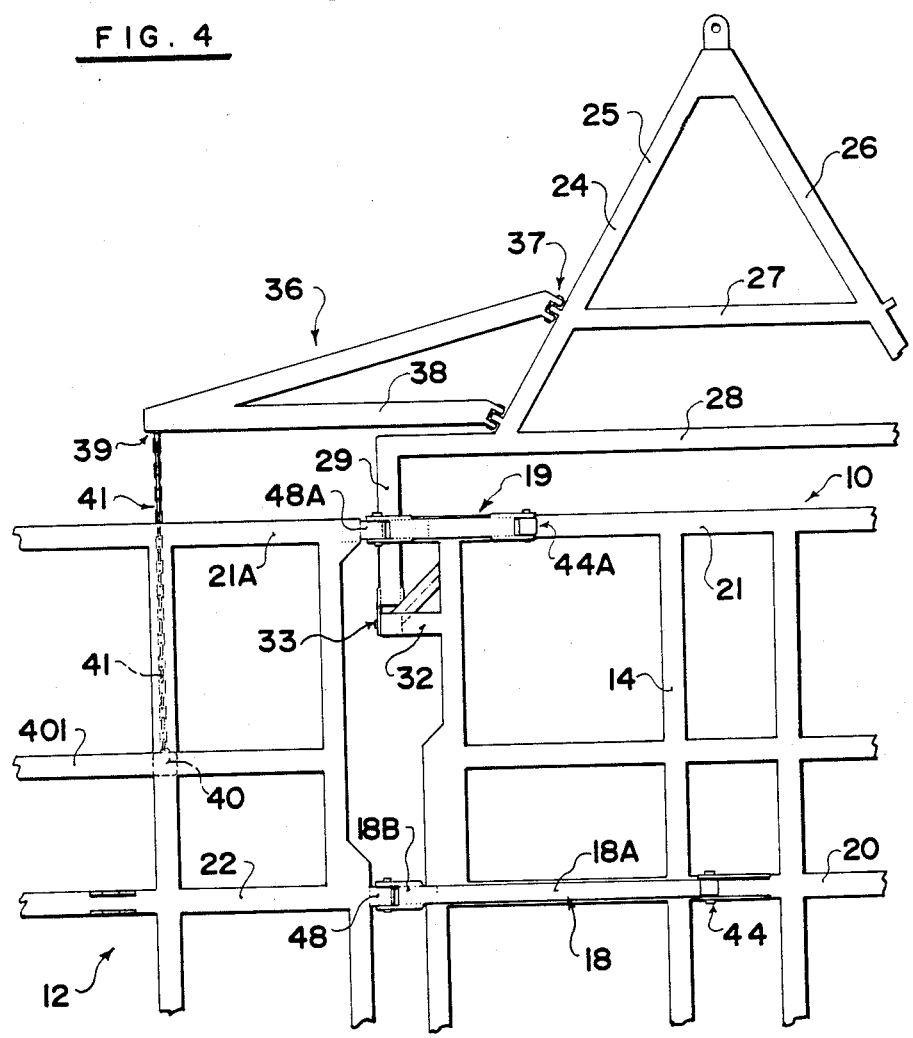
FIG. 5 is a partial plan view of the implement of FIG. 1.

Referring particularly to FIG. 5, it will be noted that the pivot couplings 37 of the hitch wing portions 36 are co-axial but the axis thereof is inclined relative to the forward direction. As the hitch wing section is lifted therefore by pivotal movement of the inner wing section of the implement, the apex 39 of the hitch wing moves rearwardly. This reduces the distance between the apex 39 and the bracket 40 and produces slack in the chain 41. In this way, the main hitch section can pivot about the brackets 33 over rough terrain while relative movement about the apex 39 and bracket 40 caused by that movement is taken up by the slack in the chain 41. In one example, the coupling 37 are offset to produce a rearward movement of the apex 39 in the raised position of approximately 10 inches.

In an alternative arrangement (not shown) the chain 41 is replaced by a pair of rigid couplings. Thus a forwardly directed tubular strut is coupled at a rear end to a horizontal, transverse pivot point at the mounting 40 and a vertical pin arranged adjacent the outer end of the hitch wing portion 36. the vertical pin is mounted on a frame which is retained in the same plane on the hitch wing portion 36 but is pivotal about a second vertical pin mounted on the hitch wing portion 36 inwardly of the outer end. Thus the chain is replaced by a flexible coupling provided by the pivot pins, the frame and the strut which can flex to accommodate the changes in distance which occur as the device moves to transport position.

In addition the portion of the hitch connecting bracket 32 is moved rearwardly to align with the coupling 40 so that the pull of the hitch is applied along a common transverse line.

Since various modification can be made in my invention as hereinabove described, and may apparently widely different embodiments of same made within the spirit and scope fo the claims without departing from such spirit and scope, it is intended that all matter contained in the accompanying specification shall be interpreted as illustrative only and not in a limiting sense.

I claim:

1. A pull-type agricultural implement comprising a central frame section and two outer wing sections, the sections arranged in-line transverse to the direction of working motion of the implement with an inner end of each each of the wing sections lying closely adjacent a respective one of outer ends of said central section, each of said sections comprising a frame for supporting ground-working tools and ground wheels for carrying the frame across the ground, and two pivotal coupling means each for interconnecting an inner end of a respective one of the wing sections to the respective outer end of the central section so as to allow pivotal movement of said respective one of said wing sections relative to said central section about an axis generally parallel to the direction of working motion, each said pivotal coupling means being arranged to define said axis and comprising first and second separate and independently movable levers arranged in spaced parallel relationship generally at right angles to said direction, means mounting one end of each of the levers on said respective one of the wing sections adjacent the inner end of said respective one of the wing sections for pivotal movement about a first horizontal axis generally parallel to said direction and a second horizontal axis generally at right angles to said direction, means mounting the other end of each of the levers on the central section at a position inboard of the respective outer end of the central section for pivotal movement about a further horizontal axis parallel to said direction whereby said one end of each of the levers is free to lift in a vertical direction to allow the inner end of the respective one of the wing sections to lift and means on the central section restricting the downward movement of each of the levers to limit the downward movement of the inner end of the respective one of the wing sections.

2. The implement according to claim 1 wherein each of the levers includes a straight portion extending along the central frame section and a downwardly cranked portion at a position beyond the respective outer end of the central frame section to allow the inner end of the respective one of the wing sections to descend to a position below the respective outer end of the central section.

3. The implement according to claim 1 wherein the central section includes a first and second strut lying parallel to and directly below the first and second levers respectively.

4. The implement according to claim 1 wherein the second lever is shorter than the first lever.

5. The implement according to claim 1 wherein the second lever is arranged at the front of the central section relative to the direction of working motion of the implement and wherein the first lever is arranged adjacent a mid-position of the central section.

6. The implement according to claim 1 including a hydraulic cylinder actuating means for pivotally lifting said respective one of the wing sections about said one end of each of the levers to a position in which the respective one of the wing sections extends vertically upwardly from the respective outer end of the central section.

7. The implement according to claim 6 wherein each of the wing sections includes an inner wing frame portion and an outer wing frame portion, means pivotally coupling adjacent ends of the inner and outer wing frame portions for pivotal movement about a still further horizontal axis parallel to said direction of working motion whereby the outer wing frame portion can fold into a position at right angles to the inner wing frame portion, said activating means including a link connected to said outer wing frame portion for folding said outer wing frame portion and including a slide coupling so as to accommodate changes of angle between said inner and outer wing frame portions during movement thereof across the ground in a working position.

8. The implement according to claim 7 including a latch pin for limiting movement of said slide coupling during operation of said hydraulic cylinder actuating means to fold said outer wing frame portion relative to said inner wing frame portion.

9. The implement according to claim 1 wherein said pivotal coupling means is arranged such that each of said wing sections can move in a folding movement about said horizontal axis generally parallel to the direction of working motion from a working position to a folded position of said each of said wing sections in which said frame of each of said wing sections lies in a substantially vertical plane and including a hitch forwardly of said central section and said wing sections for attachment of the implement to a tractor, the hitch including a central hitch portion, means attaching the central hitch portion to the central frame section for pivotal movement about a further horizontal axis transverse to the direction of working motion and two wing hitch portions each having an outer end extending outwardly from the sides of the central hitch portion and means coupling an inner end of each of said wing hitch portions to the central hitch portion for up and down pivotal movement and elongate means connecting the outer end of each of said wing hitch portions to a respective one of said wing sections, said inner end coupling means being arranged to provide pivotal movement about an axis which is substantially horizontal and extends forwardly and inwardly such that the outer end of each of said wing hitch portions moves upwardly and rearwardly in a further folding movement as the respective one of said wing sections moves in said folding movement of said wing sections to reduce the distance between said outer end and said respective one of the wing sections, said connecting means being formed of a sufficiently flexible material that in said working position it applies tension and in said folded position it hangs loose while connected to said outer end of each of the wing hitch portions and to said respective one of the wing sections.

10. The implement according to claim 9 wherein each of said wing hitch portions is supported solely by the flexible connecting means and the central hitch portion.

11. A pull-type agricultural implement comprising a central frame section and two outer wing sections, the sections being arranged in line transverse to the direction of working motion of the implement with an inner end of each of the wing sections lying closely adjacent a respective one of outer ends of said central section, each of said sections comprising a frame supporting ground working tools and ground wheels for carrying the frame across the ground, means pivotally connecting said inner end of each of said wing sections to a respective one of said outer ends of said central section for pivotal movement about a generally horizontal axis parallel to said direction from a working position in a folding movement to a folded position of each of said wing sections in which said frame of each of said wing section lies in a substantially vertical plane, and a hitch for attachment of the implement to a tractor, the hitch including a central hitch portion, means attaching the central hitch portion to the central frame section for pivotal movement about a horizontal axis transverse to the direction of working motion and two wing hitch portions, each of said wing hitch portions having an outer end and extending outwardly from one of the sides of the central hitch portion and means coupling an inner end of each of said wing hitch portions to the central hitch portion for up and down pivotal movement and elongate means connecting the outer end of each of said wing hitch portions to a respective one of said wing frame sections, said inner end coupling means of each of said wing hitch portions being arranged to provide pivotal movement about an axis which is substantially horizontal and extends forwardly and inwardly such that the outer end of each of said wing hitch portions moves upwardly and rearwardly in a folding movement as the respective one of the wing sections moves in said folding movement of said wing sections to reduce the distance between said outer end of the respective one of said wing hitch portions and said respective one of said wing sections said connecting means for each of said wing hitch portions being formed of a sufficiently flexible material that in said working position it applies tension and in said folded position it hangs loose while connected to said outer end of the respective one of said wing hitch portions and to said respective one of said wing sections.

12. The implement according to claim 11 wherein each of said wing hitch portions is supported solely by its associated one of the flexible connecting means and the central hitch portion.

13. The implement according to claim 11 wherein said central hitch portion is connected to said central section rearwardly of a front end of said central section and wherein each of said connecting means is connected to said respective one of said wing sections rearwardly of a front end of said respective one of the wing sections.

* * * * *